United States Patent [19]

McFarlane

[11] Patent Number: 4,590,957
[45] Date of Patent: May 27, 1986

[54] PRESSURE RELIEF DEVICE

[75] Inventor: Glenton P. McFarlane, Harlow, England

[73] Assignee: Johnson Matthey Public Limited Company, London, England

[21] Appl. No.: 545,769

[22] Filed: Oct. 26, 1983

[30] Foreign Application Priority Data

Oct. 28, 1982 [GB] United Kingdom ............... 8230818

[51] Int. Cl.$^4$ .............................................. F16K 17/14
[52] U.S. Cl. .................................... 137/68.1; 251/362; 220/89 A
[58] Field of Search ................... 137/68 R; 220/89 A, 220/208, 303, 371, 372, 373; 251/362; 285/330

[56] References Cited

U.S. PATENT DOCUMENTS

| 2,017,154 | 10/1935 | Larkin | 285/330 X |
|---|---|---|---|
| 2,701,075 | 2/1955 | Cottman | 137/68 R UX |
| 2,764,173 | 9/1956 | Renner | 137/68 R |
| 3,064,854 | 11/1962 | Miller | 220/89 A |
| 3,404,698 | 10/1968 | Rouse | 137/68 R |
| 3,908,684 | 9/1975 | Short | 137/68 R |
| 3,964,520 | 6/1976 | Baas | 285/330 X |
| 4,219,040 | 8/1980 | Fallon | 137/68 R |
| 4,399,830 | 8/1983 | Brodie | 137/68 R |

FOREIGN PATENT DOCUMENTS 647060 8/1962 Canada ............................ 137/68 R Primary Examiner—Harold W. Weakley
Attorney, Agent, or Firm—Cushman, Darby & Cushman

[57] ABSTRACT

A bursting disc assembly comprises a generally tubular body provided with an external screw thread and, at one end of the body, a counterbore which forms an annular seat within the body to accommodate at least the peripheral regions of a preferably flat bursting disc; a bursting disc located on the seat and a plug with a longitudinal bore pushed into and a tight fit within the counterbore so as to hold the bursting disc in place, the plug being prevented from rotating with respect to the body by knurls which bite into the walls of the counterbore. In use, the assembly is screwed into the housing of a pressure relief device so that the free end of the plug bears against and forms a fluid-tight seal with an opening in the base of the housing and at the same time, the other end of the plug compresses the bursting disc against the seat so as to form fluid-tight seals between plug, bursting disc and seat.

1 Claim, 2 Drawing Figures

PRESSURE RELIEF DEVICE

BACKGROUND OF THE INVENTION

This invention relates to pressure relief devices and is especially but not exclusively concerned with such devices for use with closed vessels such as gas cylinders and fire extinguishers.

By a "pressure relief device" is meant a device which will permit the escape of fluid (liquid, vapour or gas) from a system so as to relieve the pressure therein when the difference between the fluid pressure in the system acting on one side of the device and the atmospheric or other pressure acting on the other side reaches a predetermined value or a value within a predetermined range of values.

Known pressure relief devices include so-called "normal" and "reverse" bursting discs. These are generally made of metal such as stainless steel or an aluminium alloy and consist of a domed central portion which is integral with a surrounding flat annular flange.

In use, this flange is clamped tightly between first and second metal collars normally by means of threaded bolts which pass through the first collar and screw into tapped holes in the second, the heads of the bolts being recessed below the surface of the first collar and the ends of the bolts, when screwed home, not projecting beyond the surface of the second. In any field of use, the interaction between the confronting surfaces of bursting disc and the collars is a contributory factor in bursting disc performance.

The resulting unitary combination of bursting disc and collars is, in turn, clamped in a fluid-tight manner between a pair of pipe flanges and, with normal bursting discs, the pressure is arranged to act on the concave surface of the disc so that in the event of the pressure exceeding a predetermined value, or a value within a predetermined range of values, the disc bursts outwardly so as to relieve the pressure.

With a reverse bursting disc, or "buckling" disc as it is sometimes called, the pressure acts on the convex surface. This type of bursting disc relieves the pressure by collapsing, generally on to a cruciform array of knives, which ensure that the dome breaks up into "petals" and thereby effects a positive relief of the pressure.

Bursting disc assemblies of the type just described are widely used in pipe-lines in chemical installations but are generally too large and expensive for use on gas cylinders, fire extinguishers and the like, although, in these applications, the positive relief of pressure which a bursting disc assembly can provide is highly desirable.

Bursting disc arrangements for use with pressurisable containers such as gas cylinders and the containers used in fire extinguishers are accordingly generally cheaper and simpler than the assemblies just described and frequently take the form of a small flat disc, usually of metal, which is secured in a seat in the base of a generally cylindrical housing welded or otherwise secured to the wall of the container. The base of the housing is provided with one or more channels which pass through the said base and communicate with the interior of the container, the disc being secured in its seat in the housing by means of a tubular holding member which is threaded on the outside and is screwed into the housing so that its inner end bears on at least the peripheral regions of the disc. In this way the outer annular portion of the disc is pressed on to the seating so as to form a fluid-tight seal therewith and to prevent the escape of any fluid introduced into the container at a pressure less than the bursting pressure of the disc.

The pressure at which the disc will burst or rupture depends inter alia upon the temperature, the dimensions of the disc, the material from which it is made, the physical state of this material and the dimensions of the bore or lumen of the tubular member which holds the disc in place and which thereby governs the deformable area of the disc as well as the clamping load applied to the disc by the tubular member.

As the pressure approaches the critical bursting pressure, the central portion (that is, the said "deformable area") of the disc tends to be deformed into a dome outwardly, that is away from the container, and, to minimise the possibility of unwanted mechanical damage to the disc during this process, the inner edge of that end of the tubular holding member which bears on the disc is rounded. Alternatively, the corresponding edge of a collar or washer, which may be interposed between the said end of the tubular member and the disc, is similarly rounded.

In order to ensure that the disc will burst at a predetermined pressure or at a pressure within a predetermined range of pressures, such as, for example, a pressure within 10% of 225 bar (about 3300 psi), the composition and physical condition of the material of the disc are very carefully controlled as are the dimensions of the disc and of the bore of the cylindrical member which holds the disc in place. In spite of these precautions, we have found that in assemblies of the type just described, the disc performance will often vary in a random and unpredictable manner which is quite unacceptable. Disc leakage and incorrect bursting pressure are the most commonly occurring faults.

A further disadvantage of assemblies of the type just described is that at filling stations for gas cylinders, for example, it is common practice for the operators to replace the bursting discs in the pressure relief devices of the cylinders before they are filled and it is not unknown on these occasions for two discs rather than one to be placed accidentally in the seats of one or more of these devices. These are dangerous mishaps which can have disastrous consequences.

Investigations have shown us that the unpredictable bursting pressures of the discs previously referred to are due, at least in part, to annular torque or shearing stresses set up in the discs when the tubular holding members are screwed down on them as a result of the tendency of the ends of the holding members to turn the discs in their seats as they are screwed down and the tendency of the seats to resist this turning movement.

For convenience, arrangements in which bursting discs may be clamped against a seat, for example, in a bursting disc assembly without being subject to the shearing stresses just referred to, will be described as "torque-free" or torque-insensitive throughout the remainder of this specification.

SUMMARY OF THE INVENTION

It is an object of this invention to provide torque-free or torque-insensitive bursting disc assemblies, as herein defined, which are also such as at least to minimise the possibility of two or more bursting discs being accidentally placed within them during assembly.

According to the invention, a "torque-free" or torque-insensitive bursting disc assembly, as herein defined, for incorporation as a sub-assembly in a pressure relief device suitable, inter alia, for use with a closed container, comprises a generally tubular body with, at one end thereof, a counterbore which forms an annular seat within the body to accommodate at least the peripheral regions of a bursting disc; a bursting disc located on the said seat and a plug provided with a longitudinal bore fitted within the said counterbore so as to hold the said bursting disc on the said seat, the arrangement being such that the plug cannot be rotated with respect to the said tubular body. Preferably, the generally tubular body, the bursting disc and the plug are all made from metallic material.

Preferably the bursting disc is in the form of a flat disc, although it may be domed before or after inclusion in the assembly.

Preferably, also, the inner edge of the seat is rounded to avoid mechanical damage to the bursting disc as it is domed either in service or before being put into service.

Further, the plug is preferably slightly proud of the lower end of the body and preferably the outer surface of the body is threaded so that it may be screwed into the housing of a pressure relief device of type previously described in the manner of the normal tubular holding member. When an assembly according to the invention is screwed into such a device, the plug bears against the seat at the base of the housing so that a fluid-tight seal may be made between the lower end of the plug and the seat at the base of the housing and the flat bursting disc is at the same time compressed between the opposite end of the plug and the seat at the end of the counterbore so as to form fluid-tight seals between the plug and disc, and disc and seat without any rotational movement being imparted to the plug and without any torque or shear stress being set up in the disc.

The plug or a part thereof should be at least a firm push-fit and preferably an interference fit in the counterbore.

The projection of the plug beyond the entrance to the counterbore in a finished assembly is a measure of the thickness of the bursting disc within the assembly or of the total thickness of two or more bursting discs which may accidentally have been included in the assembly. Careful inspection of finished assemblies should therefore reveal any which have been assembled with more than one bursting disc inside them. In addition, assemblies according to the invention will normally be put together under quieter and less stressful conditions than, for example, obtain in a gas cylinder filling station. In this way, not only is it possible to detect errors in assemblies according to the invention, but such errors are less likely to occur.

Rotation of the plug with respect to the body may be prevented by making both plug and counterbore non-circular. Alternatively, matching key ways may be provided in plug and counterbore, with a pin, which is a tight fit in both keyways, being driven between the plug and the counterbore. Yet again one of these two members may be provided with a raised key and the other with a matching keyway. Preferably, however, the plug is cylindrical and is provided with a series of straight knurls on its external surface running parallel to the longitudinal axis of the plug, the dimensions of the plug being such that for at least part of its length it is a force fit in the counterbore, and on being forced into the counterbore, cuts mating knurls on the inner surface thereof so that rotation is prevented. Preferably also, at least that portion of the plug which first enters the counterbore is knurl-free and of such a diameter that it is a smooth sliding fit in the counterbore so as to act as a guide for the plug before the knurls bite into the walls of the counterbore.

Although the bursting disc assembly according to the invention is particularly suitable for use in a known type of pressure release device as previously described, it need not necessarily be so used. Indeed, it may be used in any arrangement in which the free end of the plug forms a fluid tight seal with the end of a channel which communicates with a vessel or other container containing fluid under pressure, and in which fluid tight seals are formed between the plug and the bursting disc, and the bursting disc and the seat at the end of the counterbore.

Gas cylinders including pressure relief devices according to the invention may be used in a number of different industrial and domestic fields and may be used for storing/dispensing gases such as carbon dioxide and oxygen. The gas cylinders may be used, for example, in conjunction with the discharge of fire extinguishers as well as camping and domestic heating, cooking equipment and equipment for dispensing alcoholic and non-alcoholic drinks as well as in the production of aerated drinks.

BRIEF DESCRIPTION OF THE DRAWINGS

One assembly according to the invention will now be described by way of example only with reference to the accompanying drawing of which.

DETAILED DESCRIPTION OF THE PRESENTLY PREFERRED EXEMPLARY EMBODIMENT

Figure 1:
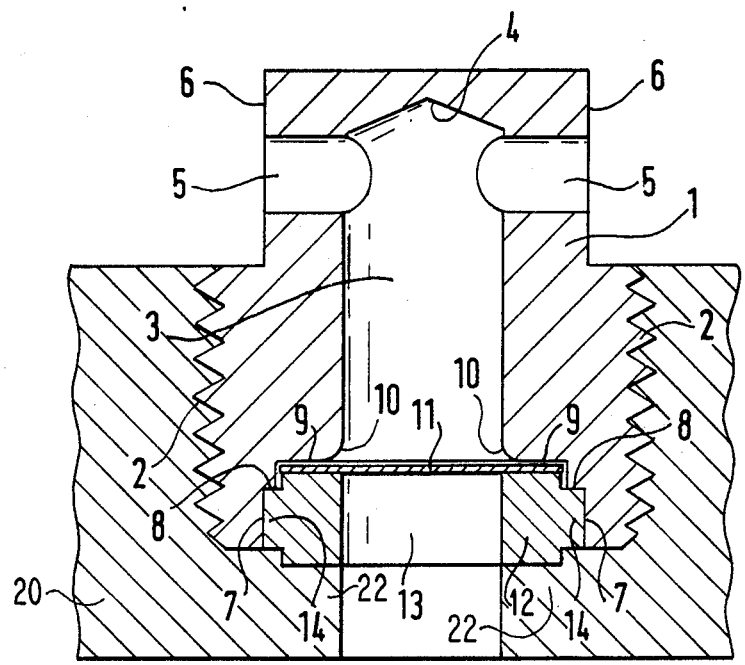
FIG. 1 is a section through the assembly, and,
FIG. 2 is a plan view of the assembly.

In FIG. 1 the assembly is seen to consist of a generally tubular body 1 provided with an external screw thread 2, a blind central bore 3 terminating at 4, tubular vents 5, two flats 6 and a counterbore 7. This terminates in the step or seat 9, the inner edge of which is rounded at 10. The blind bore 3 with side vents 5 near the closed end 4 protects the bursting disc 11 from accidental damage by articles, pieces of metal and the like, which, if bore 3 extended the whole length of the body, might fall or be poked down the bore.

The seat 9 accommodates the flat bursting disc 11 which is held in place by the generally cylindrical plug 12. This is provided with a central bore 13 and a circumferential projecting portion 14 on which are formed straight knurls (not shown) running generally parallel with the longitudinal axis of the plug. The diameter of the projecting portion 14 must be such that it will be a very tight fit in the counterbore 7 so that when it is forced home against the bursting disc 11, mating knurls are cut in the walls of the counterbore 7.

The portions of the plug 12 on either side of the projecting portion 14 are of such diameter that they are a smooth sliding fit or even a loose fit in the counterbore 7. Whichever end of the plug is presented to the counterbore will therefore enter it easily and act as a guide for the plug before the knurled section 14 bites into the wall of the counterbore 7. This effect is shown in an exaggerated form in FIG. 1 where the plug 12 has been forced into the counterbore and the knurled section 14 has bitten into the walls thereof thus forming the step 8.

Figure 2:
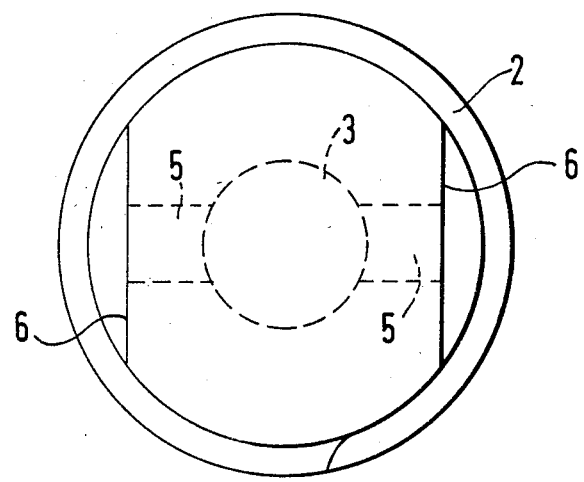

In practice, the assembly shown in FIGS. 1 and 2 may be screwed into the housing 20 of a known type of pressure relief device, typically connected to a closed gas cylinder or some similar pressurisable container, using a spanner on the flats shown at 6 in FIGS. 1 and 2.

The portion of the plug which extends beyond tubular housing 1 forms a fluid tight seal with housing seat 22.

The body 1 and plug 12 of the device may be made of brass and the bursting disc 11 of copper or nickel. Typically, the disc may be 6 mm in diameter and 0.1 mm in thickness and the bores 3 and 13 of the body and plug respectively may be 3 mm in diameter with the rounded edge 10 of the bore 3 having a radius of 0.75 mm.

I claim:

1. A torque-free bursting disc assembly, comprising: a housing having a seat;
a metal tubular body having an outer threaded surface for engaging said housing, a central bore extending through a first end of said body, and a counterbore at said first end with a rounded step between said central bore and said counterbore, said counterbore forming an annular seat;
a flat bursting disc mounted on said annular seat;
a metal plug fitting in said counterbore to hold said disc on said annular seat, said plug having a longitudinal bore and an exterior surface with a plurality of knurls thereon extending parallel to said longitudinal bore, said knurls engaging said counterbore to provide an interference fit between said plug and said tubular body so that said plug cannot rotate with respect to said tubular body, said plug having first and second ends with knurl-free exterior surfaces so that said plug is reversible, said first and second plug ends having an extending portion which extends beyond said tubular body first end when said plug is inserted in said body, said extending portion forming a fluid-tight seal with said housing seat when said tubular body is inserted in said housing.

* * * * *